(12) United States Patent
Lee et al.

(10) Patent No.: US 9,945,544 B1
(45) Date of Patent: Apr. 17, 2018

(54) LOW-PROFILE LED LIGHT FIXTURE

(71) Applicant: Global Product Sources, LLC, Madison, TN (US)

(72) Inventors: Jeremy David Lee, Madison, TN (US); Brent Lynn Lawrence, Madison, TN (US)

(73) Assignee: Global Product Sources, LLC, Madison, TN (US)

( * ) Notice: Subject to any disclaimer, the term of this patent is extended or adjusted under 35 U.S.C. 154(b) by 0 days.

(21) Appl. No.: 15/420,930

(22) Filed: Jan. 31, 2017

(51) Int. Cl.
| | |
|---|---|
| *F21V 21/00* | (2006.01) |
| *F21V 21/03* | (2006.01) |
| *F21V 3/02* | (2006.01) |
| *F21V 23/00* | (2015.01) |
| *F21V 31/00* | (2006.01) |
| *F21S 8/04* | (2006.01) |
| *A01K 31/22* | (2006.01) |
| *A01K 31/18* | (2006.01) |
| *F21Y 115/10* | (2016.01) |
| *F21Y 105/18* | (2016.01) |

(52) U.S. Cl.
CPC .............. *F21V 21/03* (2013.01); *A01K 31/18* (2013.01); *A01K 31/22* (2013.01); *F21S 8/04* (2013.01); *F21V 3/02* (2013.01); *F21V 23/001* (2013.01); *F21V 23/005* (2013.01); *F21V 31/00* (2013.01); *F21Y 2105/18* (2016.08); *F21Y 2115/10* (2016.08)

(58) Field of Classification Search
CPC .......... F21V 21/03; F21V 3/02; F21V 23/001; F21V 23/005; F21V 31/00; F21S 8/04; A01K 31/18; A01K 31/22
See application file for complete search history.

(56) References Cited

U.S. PATENT DOCUMENTS

2013/0265750 A1* 10/2013 Pickard ................. F21V 21/088
362/184

* cited by examiner

*Primary Examiner* — Thomas M Sember
(74) *Attorney, Agent, or Firm* — Luedeka Neely Group PC

(57) ABSTRACT

A light fixture configured for attachment to a standard ceiling fixture junction box includes a metal base, a printed circuit board, a circular array of LEDs, and a domed cover. The metal base has a hole pattern that matches a mounting screw hole pattern of the standard ceiling fixture junction box. The printed circuit board is attached to a bottom surface the metal base. The circular array of LEDs is attached to an outer perimeter of the printed circuit board. The domed cover is attached to the bottom surface of the metal base and covers the printed circuit board and the circular array of LEDs. The domed cover is molded from clear plastic through which light from the LEDs may pass.

3 Claims, 4 Drawing Sheets

LOW-PROFILE LED LIGHT FIXTURE

FIELD

This invention relates to the field of lighting. More particularly, this invention relates to a low-profile LED light fixture.

BACKGROUND

Generally there are four basic types of chicken houses. A broiler house houses chicks from one day old through seven weeks, where they are fed and then processed for meat. A pullet house houses chicks from three days old until they begin laying eggs, after which they are delivered to breeders. A breeder house is where mature chickens lay eggs to supply chicks for the broiler houses. A layer house is where mature chickens lay eggs for consumption.

Lighting has been a challenge for some time in chicken houses. Dust, moisture, and chemical exposure affect the consistency of light and the life of bulbs. Light levels need to be consistently varied at different times during the day and throughout the life cycle to reduce stress levels, thereby controlling the chicken's attitude and appetite which enhances their growth.

LED lighting has been used recently in chicken houses to save energy and improve light conditions. However, there are unique problems with LED bulbs, including flicker during the dimming process, moisture incursion, collection of dust, fragility, and high turnover rates.

What is needed, therefore, is a reliable, flicker-free, waterproof, and robust LED lighting fixture for use in chicken houses.

SUMMARY

The above and other needs are met by a light fixture configured for attachment to a standard ceiling fixture junction box. The light fixture includes a metal base having a hole pattern that matches a mounting screw hole pattern of the standard ceiling fixture junction box. A printed circuit board is attached to a bottom surface the metal base, and a circular array of LEDs is attached to an outer perimeter of the printed circuit board. A domed cover is attached to the bottom surface of the metal base that covers the printed circuit board and the circular array of LEDs. The domed cover is molded from clear plastic through which light from the LEDs may pass.

In some preferred embodiments, the light fixture includes power terminal wires extending from the top surface of the metal base that connect to standard AC power cable wires.

In some preferred embodiments, the domed cover includes apertures that are aligned with the hole pattern in the metal base. The apertures receive mounting screws that attach the light fixture to the standard ceiling fixture junction box.

In some preferred embodiments, the domed cover includes a translucent ring portion disposed over the circular array of LEDs for providing improved dispersal of light from the LEDs.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
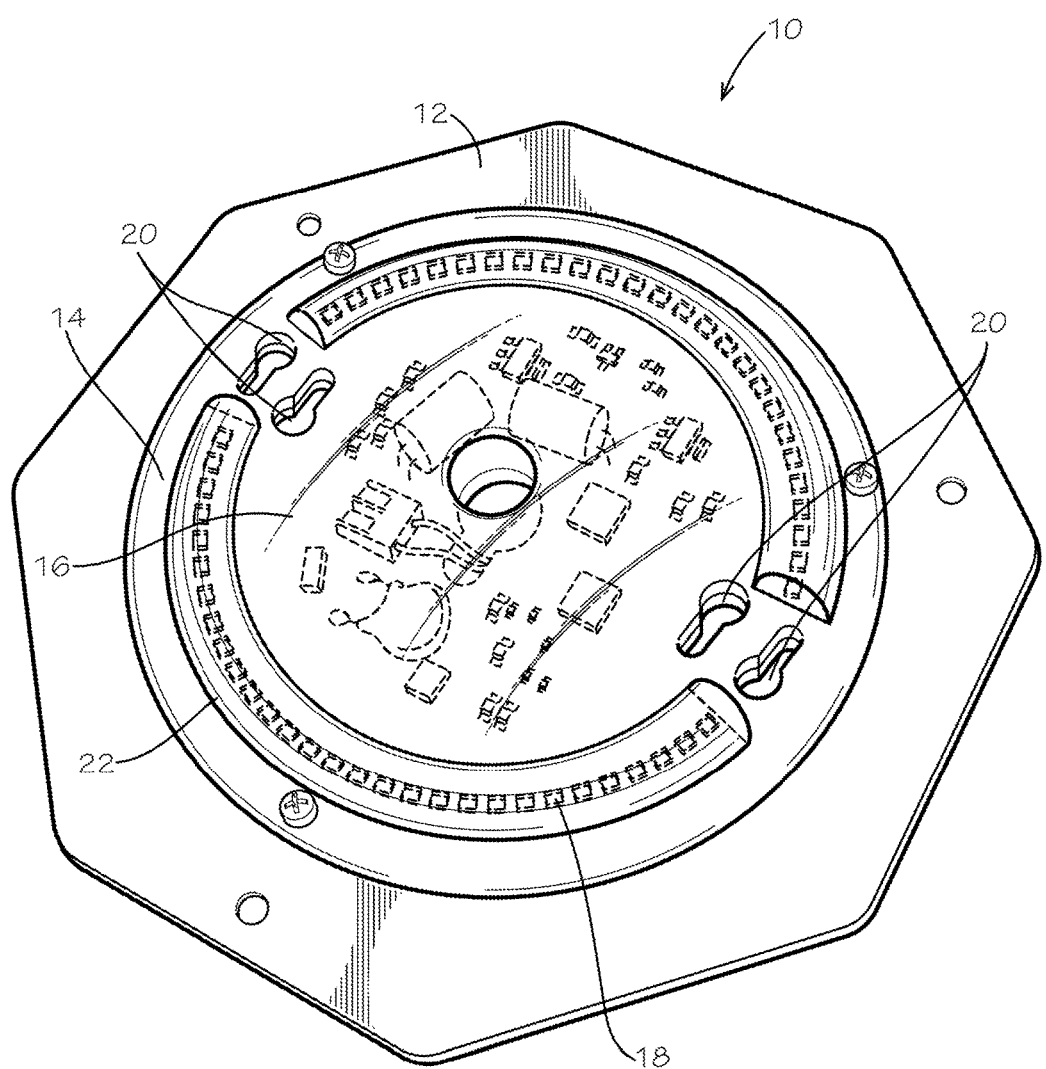
FIGS. 1-4 depict a low-profile light fixture according to an embodiment of the invention.

The figures depict an LED light fixture 10 designed to be installed to a standard ceiling light fixture junction box. The light fixture replaces standard fixtures that receive screw-in bulbs, thereby lowering the overall profile. The low-profile fixture 10 is waterproof, dustproof and chemical-proof. The low-profile aspect of the fixture provides for low levels of dust collection and easy cleaning. The fixture 10 includes mounting holes 20 that match mounting screw hole patterns of standard ceiling junction boxes.

Preferred embodiments of the fixture include a large aluminum base 12 on which a printed circuit board (PCB) 16 is mounted. While also serving as a mounting structure, the base 12 dissipates heat away from the PCB, thereby extending the life of the LEDs. The LEDs are arranged on the PCB 16 in a circular array 18. In one embodiment of the fixture 10, there are fifty-six LEDs in the array 18. A driver-on-board (DOB) control circuit on the PCB 16 controls the operation of the LEDs.

A domed cover 14 is attached to the bottom surface of the base 12 and covers the PCB 16 and the circular array 18 of LEDs. The domed cover 14 is preferably molded from clear plastic through which light from the LEDs may pass. In preferred embodiments, the domed cover includes a translucent ring portion 22 disposed over the circular array 18 of LEDs for providing improved dispersal of light from the LEDs.

Preferred embodiments of the fixture have the following features:
- 25 Watt power consumption
- Operable with dimmer switches with no flicker
- 3000K color temperature
- 2125 lumens
- 120V/AC supply voltage
- 5 foot candles at ground level, dimmable to less than 0.25 foot candles
- 10 year expected lifetime The fixture preferably incorporates surface mounted diode (SMD) LED chips having model number SMD 2835. Due to the brightness of these LEDs, the fixtures described herein can be placed on 20-foot centers on the ceiling of the chicken house and provide wall-to-wall lighting coverage over 360 degrees with substantially no shadows. By comparison, standard LED bulbs must be placed on 10-foot centers.

Figure 2:
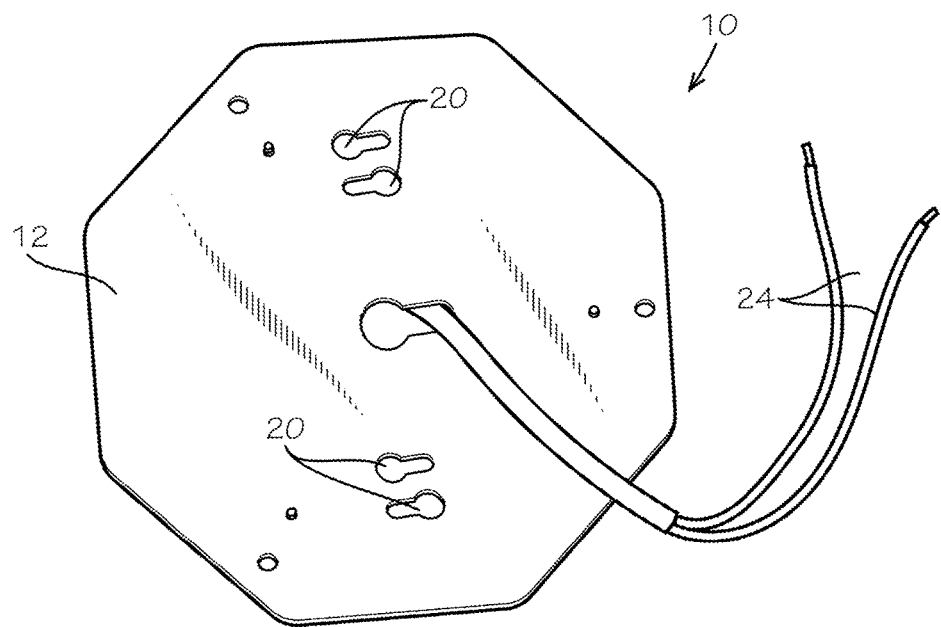
Figure 3:
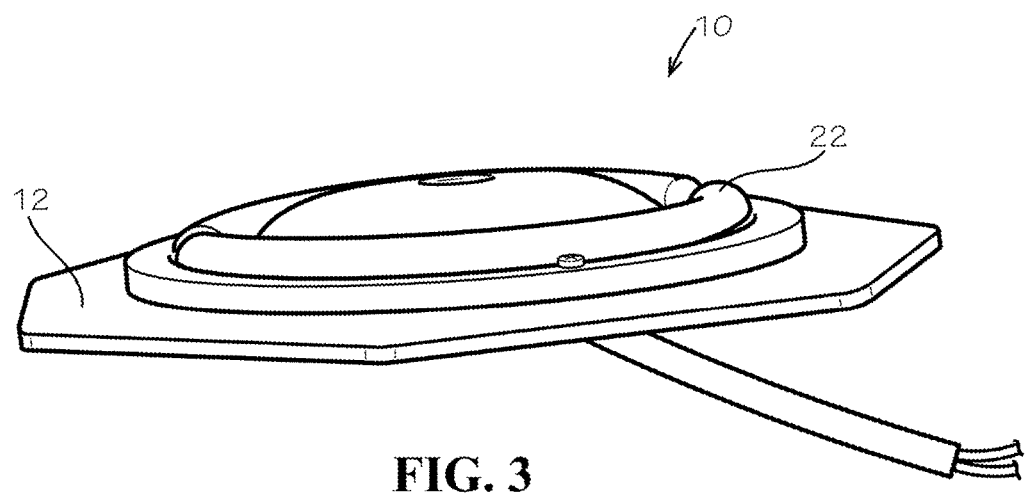
Figure 4:
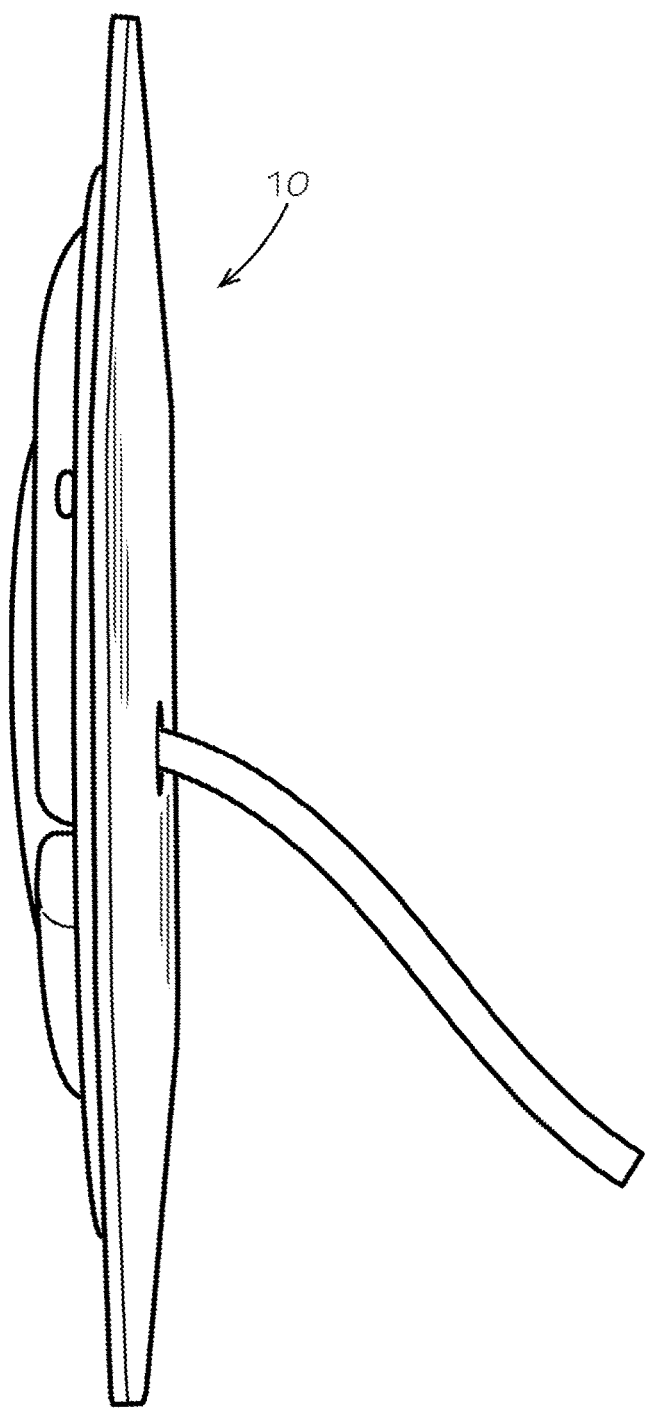
Figure 5:
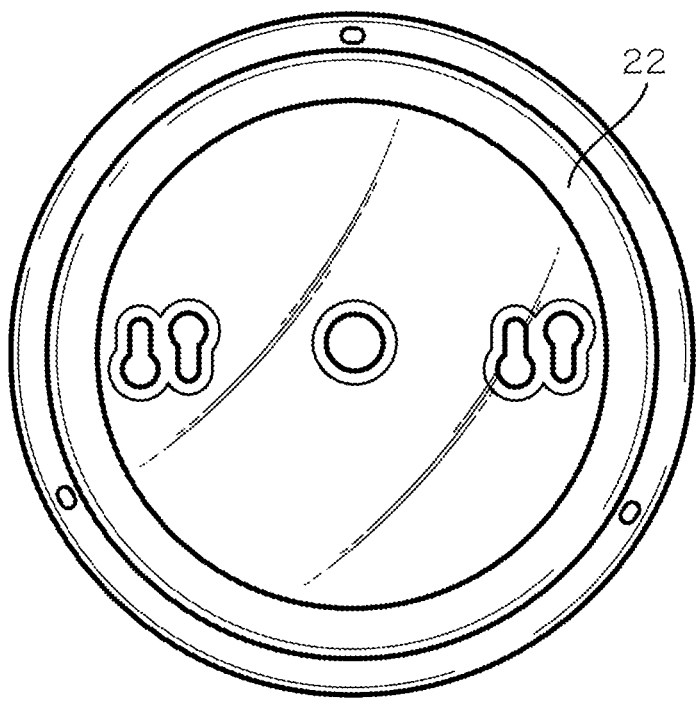
FIG. 5 depicts a domed cover of the low-profile light fixture that is removed from the fixture.
Figure 6:
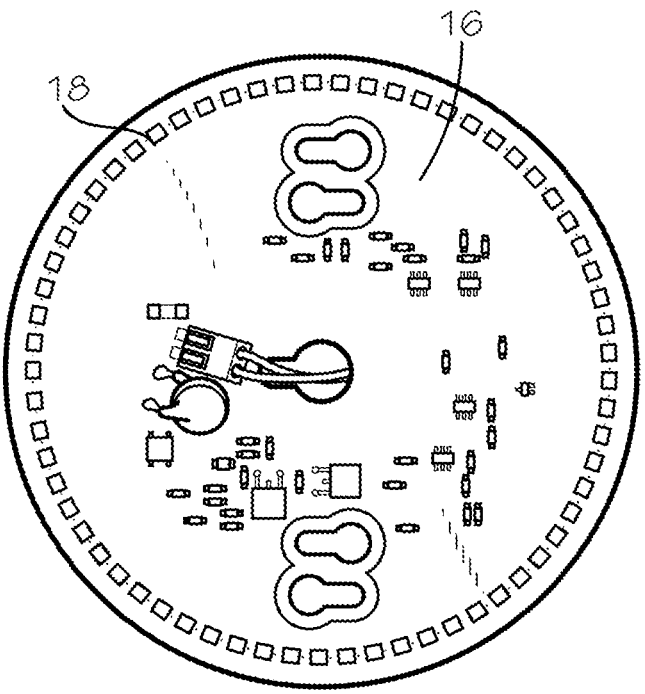
FIG. 6 depicts a printed circuit board and array of LEDs of the low-profile light fixture with the domed cover removed.

In a preferred embodiment, power terminal wires 24 extend through an aperture in the top surface of the metal base 12 for connecting to standard AC power cable wires in a ceiling junction box (FIG. 2).

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A light fixture configured for attachment to a standard ceiling fixture junction box, the light fixture comprising:
   a metal base having a hole pattern that matches a mounting screw hole pattern of the standard ceiling fixture junction box;
   a printed circuit board attached to a bottom surface the metal base;
   a circular array of LEDs attached to an outer perimeter of the printed circuit board; and
   a domed cover attached to the bottom surface of the metal base and covering the printed circuit board and the circular array of LEDs, the domed cover molded from clear plastic through which light from the LEDs may pass, the domed cover including apertures therethrough that are aligned with the hole pattern in the metal base, the apertures for receiving mounting screws that attach the light fixture to the standard ceiling fixture junction box.

2. The light fixture of claim 1 further comprising power terminal wires extending from the top surface of the metal base, the power terminal wires for connecting to standard AC power cable wires.

3. The light fixture of claim 1 wherein the domed cover includes a translucent ring portion disposed over the circular array of LEDs for providing improved dispersal of light from the LEDs.

* * * * *

UNITED STATES PATENT AND TRADEMARK OFFICE
CERTIFICATE OF CORRECTION

PATENT NO. : 9,945,544 B1
APPLICATION NO. : 15/420930
DATED : April 17, 2018
INVENTOR(S) : Jeremy David Lee and Brent Lynn Lawrence It is certified that error appears in the above-identified patent and that said Letters Patent is hereby corrected as shown below:

In Claim 1 (Column 3, Lines 16-17), insert --of-- between "bottom surface" and "the metal base."

Signed and Sealed this
Twenty-eighth Day of January, 2020

Andrei Iancu
*Director of the United States Patent and Trademark Office*